United States Patent [19]

Hengstenberg

[11] 4,238,997

[45] Dec. 16, 1980

[54] APPARATUS FOR BLANCHING SAUERKRAUT

[76] Inventor: Eckhart Hengstenberg, Mettingerstrasse 109, D-7300 Esslingen, Fed. Rep. of Germany

[21] Appl. No.: 84,281

[22] Filed: Oct. 12, 1979

[30] Foreign Application Priority Data

Oct. 12, 1978 [DE] Fed. Rep. of Germany ....... 2844430

[51] Int. Cl.³ .............................................. A23B 7/06
[52] U.S. Cl. ..................................... 99/483; 990/348; 426/615
[58] Field of Search ............ 99/516, 483, 485, 443 R, 99/348, 323.12, 409, 403, 404; 366/144, 147, 149, 148, 235; 68/27, 58; 426/615

[56] References Cited

U.S. PATENT DOCUMENTS

| 2,403,871 | 7/1946 | McBean | 99/483 |
| 2,948,619 | 8/1960 | Ashley | 99/483 |
| 3,086,444 | 4/1963 | Back | 99/483 |
| 3,983,259 | 9/1976 | Maior | 99/516 |
| 4,137,835 | 2/1979 | Petersen | 99/348 |

Primary Examiner—Robert W. Jenkins
Attorney, Agent, or Firm—Edwin E. Greigg

[57] ABSTRACT

A series of rotatably arranged perforated sheet metal drums are proposed through which sauerkraut may be traversed in either a water or heated brine solution. A control system for heated brine is arranged so that the brine emitted from a heat exchanger passes through partitioned chambers in which each drum is arranged to rotate, the last of this series of drums adapted to receive the hottest solution and the brine thence traveling to the next adjacent drum in succession.

5 Claims, 2 Drawing Figures

APPARATUS FOR BLANCHING SAUERKRAUT

BACKGROUND OF THE INVENTION

The invention relates to an apparatus for blanching sauerkraut of the kind described in the preamble of claim 1.

Apparatuses of this kind are known; in such apparatuses, a single perforated drum rotates in a brine bath contained in a tub. The tub is embodied as having a double jacket; when this double jacket is heated, the tub and therefore the brine as well are heated through contact with the inner wall of the tub. Because the drum rotates within the tub, the sauerkraut located in the perforated drum comes into contact with the heated brine. This arrangement has the disadvantage, however, that the heat transfer from the tub to the brine and from the brine to the sauerkraut cannot exceed a certain magnitude, which is limited by the inner surface area of the tub. Thus, limits are also placed on increasing the capacity of the apparatus: If the throughput quantity were increased, given a particular structural length of the drum, the sauerkraut upon exiting the drum would not yet have reached the desired temperature of 85° C.; on the other hand, the temperature of the brine, which is already at about 90° to 95° C. (that is, not far below the boiling point), cannot be increased further. Furthermore, a large quantity of brine is required for this operation in order to be at all able to provide the close contact of sauerkraut and brine necessary for sufficiently heating the sauerkraut. Finally, the direct heating of the brine bath brings about the eventuality that some sauerkraut particles, falling through the perforated wall of the drum, are as a result, caused to be baked onto the inner wall of the tub. This is undesirable for hygienic reasons and lowers the efficiency of the apparatus. In addition, it undesirably affects the taste and the quality of the sauerkraut.

OBJECTS AND SUMMARY OF THE INVENTION

It is accordingly a principal object of the invention to create an apparatus of the kind described above in which the effectiveness of the heating output is substantially increased. The fulfillment of a requirement of this kind, given the same structural length of the drum as in the prior art, results in a substantial increase in capacity, that is, in the quantity per unit of time which can be blanched by a system of this kind.

This object is attained by means of the characteristics disclosed in claim 1. The invention pertains further to several further advantageous embodiments.

The invention creates a cascade of drums arranged in an aligned series, in which one drum transfers the sauerkraut supplied thereto on into the next drum. Because each drum rotates within a separate brine bath, it is assured that the brine fluid of the foremost drum has the lowest temperature, and the brine fluid in the last drum (in terms of the direction in which the sauerkraut is being supplied) has the highest temperature, so that there is an increase by stages in the temperature of the sauerkraut in the direction of supply, and the brine circulates through the drum unit in the opposite direction from the sauerkraut. In other words, there is a counter current flow of sauerkraut and brine. If, the brine in the last stage, for example, has acted upon the sauerkraut and increased its temperature, then the brine itself will also have undergone a consequent loss in temperature; however, it still has a sufficient degree of temperature to be used for heating the sauerkraut in the previous stage, which has not yet been heated to that particular degree. In other words, while the temperature of the sauerkraut rises in the direction of supply, the temperature of the brine, which is used for heating this same sauerkraut, also increases in this direction, so that an optimal utilization of the heat energy taken up from the heated brine is provided through a kind of counterflow principle. In this apparatus, the brine is heated externally—that is, it is not heated within the bath itself. Thus, a larger quantity of brine can be pumped through the apparatus. The heat transfer from the brine to the sauerkraut is substantially improved by means of the cascade. Thus, the brine as well can be resupplied, by being heated externally, with an accordingly greater quantity of heat, without being limited by the heat-exchanging capacity of the double jacket of the tub. Because the inner wall of the tub is no longer heated, the danger that sauerkraut particles will bake onto the inner wall thereof is also reduced. Thus, despite the higher throughput, the quality of the product is improved.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
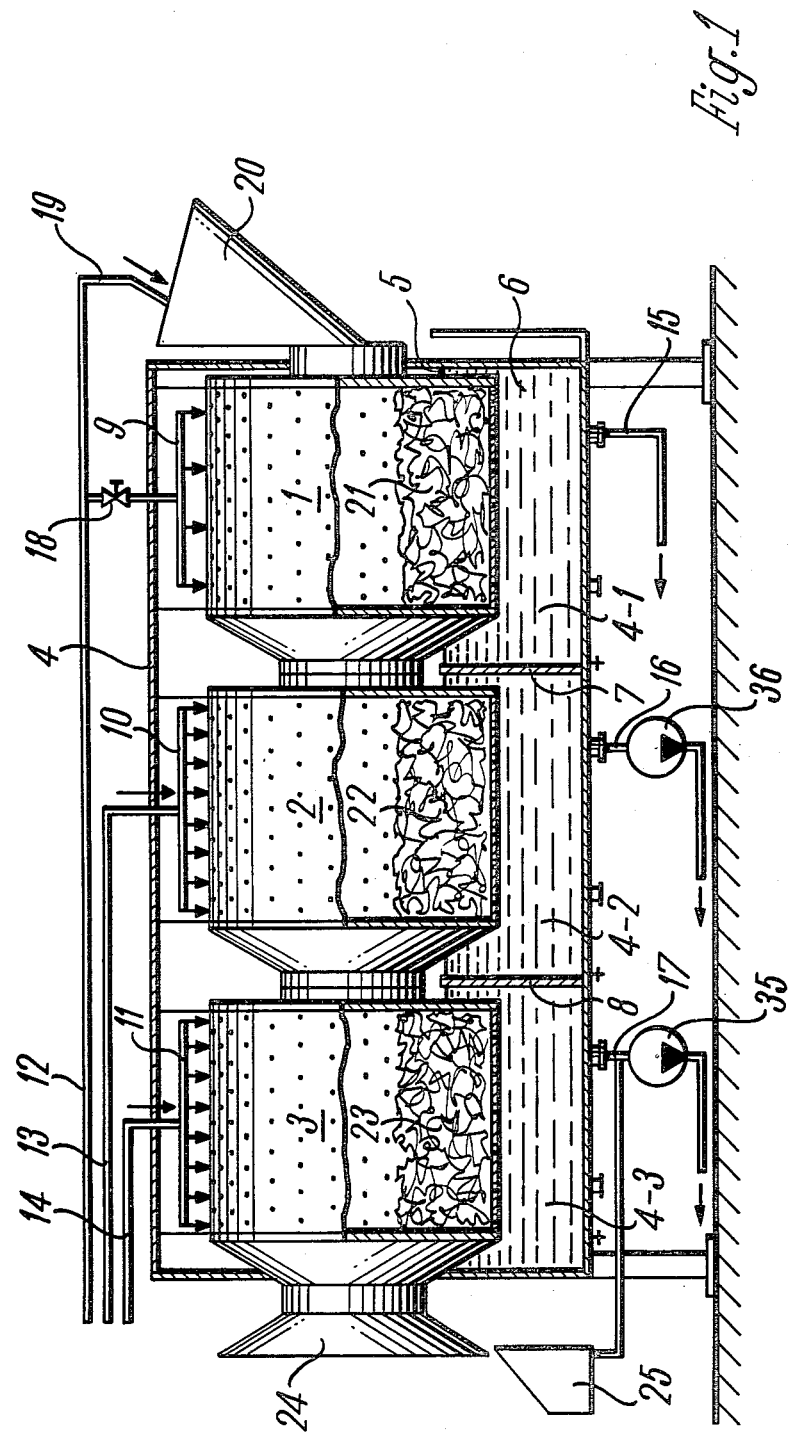
FIG. 1 shows a cross-sectional view of an exemplary embodiment of the invention.

Turning now to the drawings, the apparatus for blanching sauerkraut shown in FIG. 1 is made up of three drums 1, 2, 3, which (as will be described in detail below) are connected seriatim in a cascade connection and are arranged to communicate with one another in such a manner that they are all rotated by a common drive means (not shown). The cylindrical wall of the drum is made of perforated sheet metal, as indicated by the dots, with the individual apertures being large enough to permit the passage of fluid therethrough but not so large that sauerkraut can pass through these openings from the interior of the blanching drum to the outside thereof. The drum unit rotates within a sealed housing 4 and is submerged to the level indicated at 5 in brine 6. In the lower part, in which the housing 4 is filled with brine 6, the housing 4 is subdivided into three compartments 4-1, 4-2, 4-3 by means of partitions 7, 8. Above each drum in the compartments, there is one each of the three guideways 9, 10, 11, which may be embodied, for example, in the manner of a shower or sprinkler. Through these guideways 9, 10, 11, via lines 12, 13, 14, the supply of brine is furnished to the rotating drums. The brine first travels through the perforated outside walls of the drum into the interior of the drum and from there acts upon the sauerkraut 21, 22 or 23; further below, the brine again passes through the perforated lower walls of the drums into the particular compartment of the housing 4 associated with that drum. The first blanching drum 1 through which sauerkraut is delivered to the entire drum unit alternatively may be supplied with brine through the supply line 19 and the funnel 20. This kind of fluid supply is particularly advantageous when there is high throughput, for the sake of avoiding backups in the inflow. The brine is removed from the compartments 4-1, 4-2, 4-3 of the housing 4 through lines 15, 16, 17. The sauerkraut 21, 22, 23 is moved through the drum unit, when the drums are rotated, by advancing means which are not shown, such as auger-type impelling means or the like fixed within the drums, in the supply direction which is from right to left (as viewed in the drawing). The sauerkraut is poured into a funnel 20 and leaves the drum unit at the outlet nozzle 24. A collection container indicated by reference numeral 25 has an outlet communicating with line 17.

Figure 2:
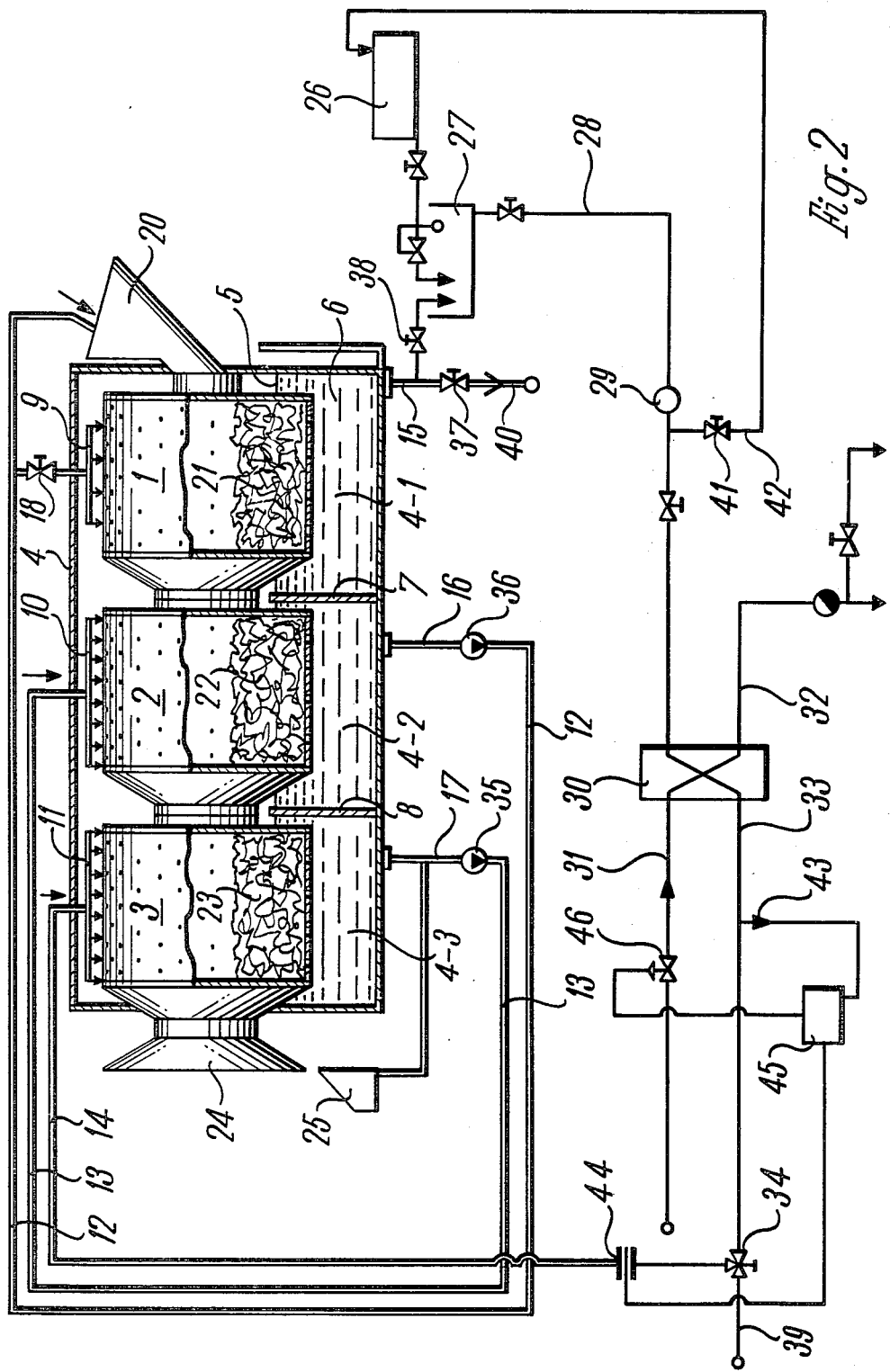
FIG. 2 shows another cross-sectional view of the same exemplary embodiment together with a circuit diagram.

As illustrated in FIG. 2, brine (cellular fluid from the freshly cut, salted cabbage) flows from the supply container 26 into an equalization container, a line 28, and a pump 29 and arrives at a plate-type heat exchanger 30, in which it is heated up to ca. 90° C. by hot water vapor which is supplied thereto through the line 31 and carried away through the line 32. The brine leaves the plate-type heat exchanger 30 via the line 33 and proceeds through the 3-way valve 34 into the line 14; from here, it is delivered via the brine supply line 11 into the drum 3, into which the sauerkraut 23, with a temperature of 60°–65° C., has already been delivered. In drum 3, the sauerkraut is heated up to ca. 85° C. From the compartment 4-3 of the housing 4, the brine, having a temperature after losing heat to the sauerkraut of ca. 60°–65° C., is withdrawn by the pump 35 through the line 17 and delivered into the line 13, through which it travels until it arrives at the brine supply line 10 and from there it proceeds into drum 2 in the same manner as has just been described in connection with drum 3. In drum 2, the brine again heats the sauerkraut 22, which enters at a temperature of ca. 45° C., by approximately 20° C. The brine, which as a result is again further cooled down, is then delivered via the line 16 and the pump 36 into the line 12, from which (if valve 18 is opened) it proceeds through the brine guideway 9 into the drum 1 and heats the sauerkraut 21 located therein up to a temperature of ca. 45° C. From the compartment 4-1, the brine, now cooled down still further, proceeds through the line 15 into the equalization container 27 when valve 37 is open and valve 38 is open.

The important factor in this circulatory system is the cascade connection of the drums one after another which is arranged in such a manner that the passage of the sauerkraut through the drum unit is provided by the drum 3 which has the highest temperature (last stage), the drum 2 which has an intermediate temperature (middle stage) and the drum 1 having the lowest temperature (first stage), wherein the sauerkraut moves from right to left. In contrast, the brine, externally heated by means of the plate-type heat exchanger 30, is supplied at the left at the highest temperature, takes its course through the drum unit in the direction opposite the direction in which the sauerkraut is traveling through the drums, and thereby is reduced in temperature in steps of as equal size as possible. Thus, with respect to the heating energy and to the quantity of brine required for this circulatory system, a particularly high level of efficiency is attained. In comparison with the known blanching apparatuses initially described above, approximately twice the quantity of cabbage per hour can be processed (that is, heated to ca. 85° C.) given an identical drum length; alternatively, if the throughput quantity remains the same, the structural length of the entire drum unit can be considerably reduced in size. Furthermore, the heated brine, which is put to use to heat the sauerkraut, in practical fashion, in three stages before being reheated itself, is thus very much better utilized. The individual stages are set up such that each temperature increase for the sauerkraut is approximately equal in amount in each stage.

The same system may also be used, with slight modifications, for the washing of cabbage. Only the valve 34 needs to be switched over so that it delivers fresh water from the line 39 into the line 14. At the same time, the valve 38 is closed, while the valve 37 is opened. Thus the water then flows to the outflow line 40. The system can be evacuated via the line 42 into the supply container 26 by opening the valve 41. A closed control loop comprising the temperature probe 43, flowthrough rate meter 44, control circuit 45 and flow control valve 46 controls the supply of steam in the blanching operation on the line 31 to the plate-type heat exchanger 30 in such a manner that the brine leaving the heat exchanger 30 via line 33 always has the same temperature.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An apparatus for blanching sauerkraut comprising, a rotatable perforated sheet metal drum unit having an inlet zone and an outlet zone for passage of sauerkraut therethrough and a receptacle for holding a supply of brine through which the sauerkraut is arranged to travel, further wherein a series of drums comprising said unit are arranged seriatim with the sauerkraut being advanced through each of said drums from said inlet zone to said outlet zone, said receptacle being positioned to provide spaced areas for said brine and within which each said drum unit can rotate, heating apparatus for said brine and flow control means to supply heated brine from said drum in said oulet zone to the next adjacent drum in succession.

2. An apparatus in accordance with claim 1, further wherein said drum unit comprises at least three drum members, each of said drum members having cylindrical inlet and outlet openings of a lesser circumferential area than said drum members.

3. An apparatus in accordance with claim 1, further wherein said supply of brine is fed to said drum member through guideway means disposed above said drum.

4. An apparatus in accordance with claim 1, further wherein said brine which exits from said drum member disposed adjacent to said inlet zone is supplied through a line to an equalization container, from which said brine proceeds through said line to said heating apparatus which thereafter delivers said heated brine into said drum member disposed adjacent to said outlet zone.

5. An apparatus in accordance with claim 4, further wherein a temperature probe is provided in said line for said heated brine delivered by said heating apparatus, said heating apparatus further including a heat exchanger, and further that a flowthrough rate meter which is adapted to emit signals is disposed in said line, that said signals emitted by said flowthrough rate meter proceed to a closed-loop control apparatus, which is adapted to control a supply of hot steam to said heat exchanger.

* * * * *